United States Patent [19]

Pelletier

[11] 4,379,668

[45] Apr. 12, 1983

[54] LOCKING DEVICE FOR SECURING CARGO IN A VEHICLE

[75] Inventor: Robert Pelletier, Le Perreux, France

[73] Assignees: Pelletier Exploitation, Aubervilliers; Siren, Versailles, both of France

[21] Appl. No.: 237,700

[22] Filed: Feb. 24, 1981

[30] Foreign Application Priority Data

Feb. 26, 1980 [FR] France ............................ 80 04242

[51] Int. Cl.³ .............................................. B60P 7/08
[52] U.S. Cl. ........................................ 410/77; 410/69
[58] Field of Search ................... 410/77, 78, 79, 83, 410/92, 68, 69; 296/35.1

[56] References Cited

U.S. PATENT DOCUMENTS 4,089,275 5/1978 Pelletier ........................... 410/79
4,121,789 10/1978 Lent .................................. 410/77

FOREIGN PATENT DOCUMENTS 2117983 12/1971 France .
2255248 12/1974 France .
2277024 6/1975 France .
2331507 11/1975 France .
2335676 7/1977 France ............................... 410/79

Primary Examiner—Joseph F. Peters, Jr.
Assistant Examiner—M. J. Hill
Attorney, Agent, or Firm—Stevens, Davis, Miller & Mosher

[57] ABSTRACT

Locking device for securing cargo in containers or pallets, comprising two latches hinged together and hinged to the locking device frame, one by a fixed hinge pin and the other by a hinge pin which can move in translation.

The latches are constantly acted on by a spring which draws them into the cargo locking position, in which the latches project up above the frame, by a spring and are changed over, by downwards pressure on the latches, to the cargo unlocking position, in which they are retracted.

14 Claims, 5 Drawing Figures

LOCKING DEVICE FOR SECURING CARGO IN A VEHICLE

FIELD OF THE INVENTION

This invention involves a locking device for securing freight in a vehicle, particularly for securing containers or pallets inside an aircraft.

BACKGROUND OF THE INVENTION

Locking devices of this type are already known which consist of a frame made up of two long members connected together by two end cross members and capable of being fastened to the floor of the space in the vehicle intended to take the cargo instead of one or more running rollers or balls fitted to the floor for handling the containers or pallets. A first and a second latch, hinged to each other at one of their ends by a common transverse pivot pin, are mounted in this frame. The first of the said latches has as its other end a transverse hinge pin fitted in a fixed position between the said long members. The second of the said latches has at its other end a transverse hinge pin guided in translation in longitudinal slideways in the long members. Means are provided for changing the said latches from a cargo unlocking position in which the said latches are retracted down into the said frame to a cargo locking position in which the latches project up above the frame. Finally means are provided for blocking the latches in this cargo locking position.

According to a known embodiment of these locking devices, the latches are acted on and held in the cargo unlocking position by a spring. The blocking means provided on the locking device then hold the latches, against the action of this spring, in the cargo locking position. In order to change the latches from the cargo locking to the unlocking position, all that is needed is to step on a lever acting on the said blocking means, so that the released latches, under the action of the said spring, automatically go over to the cargo unlocking position. In order to bring the latches from the unlocking position to the cargo locking position it is necessary, on the other hand, to exert a pull, by hand, on a ring provided on the pin shared by the two latches and pull the latter against the action of the spring as far as the cargo locking position in which the latches are held by the above-mentioned blocking means.

According to another embodiment of these known locking devices in which the latches are also acted on and held in the cargo unlocking position by springs and are held in the cargo locking position, against the action of the said springs, by blocking means, the lever provided to release the latches in the cargo locking position makes it possible, by means of a gear transmission system, to also, on stepping on this lever, bring the latches, against the action of the said springs, from the cargo unlocking to the cargo locking position. However, this foot operation of the lever to change the latches over from the unlocking to the cargo locking position implies a relatively large steady force and the gear transmission system between the said lever and the latches makes the locking device construction significantly more complicated.

SUMMARY OF THE INVENTION

The present invention involves a locking device of the type defined above which differs from known locking devices in that the latches can be changed from the locking position to the unlocking position and back each time by simply pressing down with the foot, the locking device being overall of very simple construction, however. Another object of the invention is a locking device of the type defined above which is more compact and in particular shorter than known locking devices.

The locking device conforming to the invention for securing cargo inside a vehicle, notably for securing containers or pallets in an aircraft, comprises a frame that can be fastened to the floor of the vehicle space intended to take the freight, consisting of two long members connected together by two end cross members. A first and a second latch are hinged together at one of their ends by a common transverse pivot pin. The first of the said latches has at its other end a transverse hinge pin fitted in a fixed position between the two frame long members. The second of the said latches has at the end a transverse hinge pin which moves longitudinally (in translation) in longitudinal slideways or guideways in the said long members. The locking device also comprises means for changing the said latches from a cargo unlocking position in which the said latches are retracted downwards into the said frame with the said hinge pins moving apart, to a cargo locking position in which the said latches project above the frame with the said hinge pins coming nearer to each other. Furthermore the locking device comprises the means for blocking the said latches in this cargo locking position.

According to the invention, the locking device is fitted with a spring (first elastic means) pushing the latches over to the cargo locking position, and with means for blocking the latches in the cargo unlocking position against the action of the said spring.

The locking device according to the invention is therefore fundamentally different from the known locking devices described above in that the latches, instead of being pushed by the springs from the cargo unlocking position to the cargo locking position and being held in the cargo locking position against the action of these springs by the blocking means, are held both in the locking and in the cargo unlocking position by blocking means.

The latches and the slideways for the hinge pin, which can move longitudinally, of the second latch are advantageously made so that in the cargo locking position the common pivot pin of the two latches is located at the vertex of a roughly isosceles triangle the two other angles of which are defined by the fixed hinge pin of the first latch and by the movable hinge pin of the second latch, with this movable hinge pin being up against the end of the slideways nearest the fixed hinge pin of the first latch.

In order to bring the latches from the cargo locking to the unlocking position, pressure is exerted downwards with the foot on the latches near their common pivot pin so that the movable hinge pin of the second latch moves away from the fixed hinge pin of the first latch and the two latches sink into the frame, pivoting in opposite direction round their respective hinge pins as far as the cargo release position in which they are completely retracted into the frame and held by the blocking means.

In order to change the latches over from the unlocking position to the cargo locking position, all that is needed is to operate the latch blocking means in the unlocking position so that, under the action of their spring (first elastic means), the latches are automatically brought back to the cargo locking position where they are held by the blocking means.

The means of blocking the latches in the cargo locking position are advantageously installed on the latches in such a manner that, in the cargo locking position, the operating surface of the said means is placed above the common pivot pin of the latches. It is thus possible, by exerting pressure with the foot on the said operating surface, to release the latches in the cargo locking position and to subsequently bring them against the action of their spring (first elastic means) to the cargo unlocking position and far enough for them to be blocked in this position by the blocking means.

The means for blocking the latches in the cargo locking position (second blocking means) advantageously consist of a blocking stirrup with two side arms perpendicular to the said latch hinge pins fitted to pivot, between the cross strap and the free ends of the stirrup, on the hinge pin, capable of moving in translation, of the second latch. The free ends of the two arms of this stirrup on the side of the first latch's fixed hinge pin, are pushed upwards round the said movable hinge pin by a spring (second elastic means) and are shaped like hooks open towards the top. Preferably, the said arms each have an external transverse guide pin at their free end working, under the action of the said spring, in conjunction with a lower slideway in the associated long member. This slideway comprises a ramp which, when the latches pass from the unlocking position to the cargo locking position, makes the hook-shaped free ends of the stirrup swing down, and, below the fixed hinge pin of the first latch, a notch with more or less vertical sides. When the latches are in the cargo locking position each guide pin is forced by the action of the stirrup spring (second elastic means) up into the said notch and the hooks at the free ends of the stirrup arms thus hook from beneath onto the fixed hinge pin of the first latch blocking the hinge pins of the two latches and locking them in their relative positions.

The means for operating the latch blocking stirrup in the cargo locking position (blocking releasing means) can advantageously consist of an operating stirrup with two arms, perpendicular to the latch hinge pins, mounted to move longitudinally on the first latch so that the cross strap of the stirrup, forming the operating surface, lies above the latches when the latter occupy the cargo locking position. The free bottom ends of the operating stirrup arms each have a transverse pin bearing against the upper edge of the arms of the blocking stirrup, between the pin hinging the latter on the second latch and the free ends of the arms of this blocking stirrup. In addition, the operating stirrup has an oblong hole in each of its arms in the longitudinal direction of the said arms, there being a pivot pin shared by the two latches passing through the said stirrup arm holes.

The means of locking the latches in the cargo unlocking position (first blocking means) may advantageously consist of a lever installed to hinge on the frame, via a cross pin, and pushed in one direction by a return spring, and by a cam formed on the second latch round the latter's longitudinally movable hinge pin. This cam makes the said lever rotate against the action of its spring at the end of the movement of the latches from the locking position to the cargo unlocking position, until a setback or shoulder formed after the said cam on the second latch releases the lever and allows this latter to come and engage behind this setback to block the latches in the cargo unlocking position.

BRIEF DESCRIPTION OF THE DRAWINGS

Referring to the attached drawing we shall hereafter describe in greater detail an illustrative embodiment which is not restrictive, however, of a cargo securing locking device conforming to the invention; in this drawing.

DESCRIPTION OF THE PREFERRED EMBODIMENT

Figure 1:
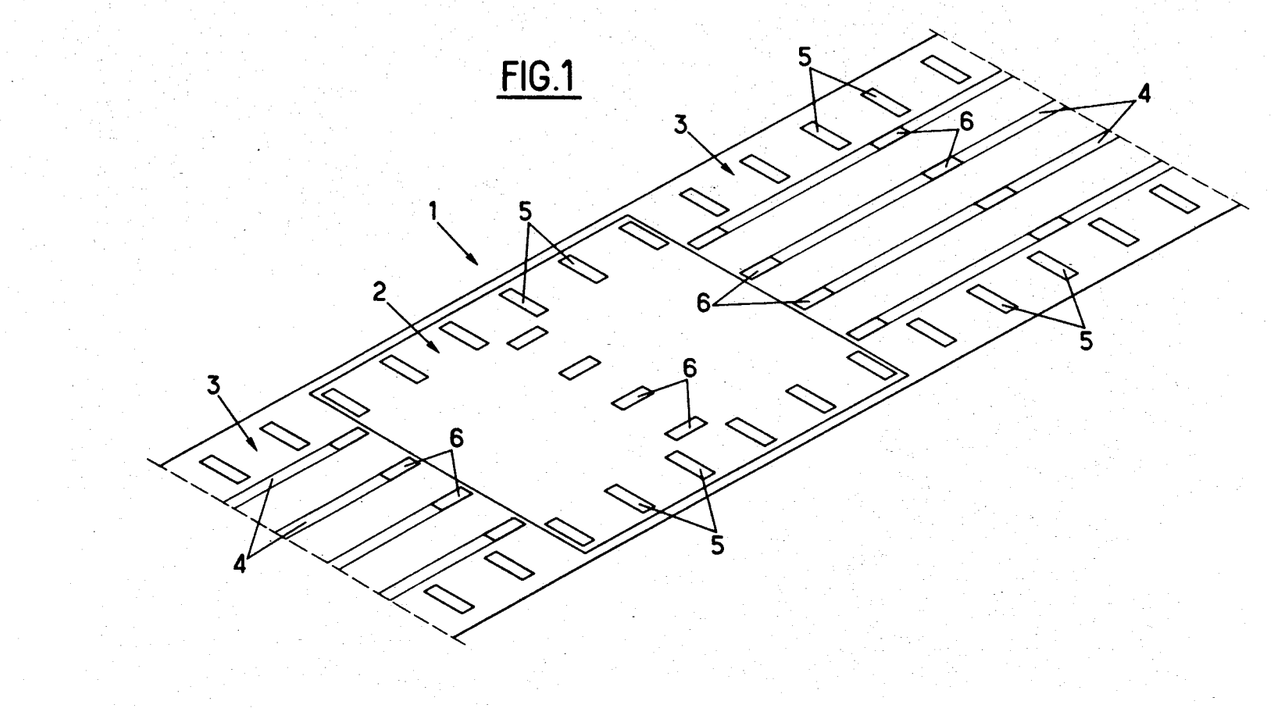
FIG. 1 is a schematic perspective view of the floor of an aircraft cargo compartment fitted with locking devices according to this invention.

FIG. 1 illustrates the floor 1 of an aircraft cargo compartment; this floor is fitted out for loading pallets or containers. At the location of the cargo compartment side loading door or doors not shown the floor 1 has a middle floor section 2 fitted with a set of running balls not shown, which are uniformly spaced over the whole of the surface of floor section 2. Floor section 2 connects on either side in the longitudinal compartment direction with a floor section 3 also fitted with several parallel longitudinal rails 4 provided with rollers which are not shown. Side guides 5 are distributed along the two long sides of the whole of floor 1; these guides 5 can be retracted down at the position of the compartment side door or doors.

Locking devices 6 are spaced in several transverse rows from one longitudinal end of the floor 1 to the other. In floor section 2 these locking devices 6 are fastened in cavities provided in the floor. In floor sections 3 the locking devices 6 are fastened in the rails 4 which are without rollers at the position of these locking devices.

In order to load and fasten the cargo to the floor 1 the pallets or containers are brought up in the usual way through the side door or doors sideways onto floor section 2 fitted with balls and they are pushed sideways on floor section 2 up to a transverse position in line with their final position of anchorage to the floor 1. If this position lies on a floor section 3 they are then pushed longitudinally along floor 1, first on the balls in floor section 2 and then on the rollers of the rails 4 in a floor section 3, up to their final position between two rows of locking devices 6. The said locking devices 6 are put into the locking position so that the containers or pallets are fixed in the longitudinal direction of the floor 1 by the locking devices 6 and in the transverse direction by the side guides 5.

Referring to FIGS. 2 to 5 we shall now describe an illustrative and non-restrictive embodiment of a locking device 6 mounted on one of the floor sections 3, i.e. in one of the rails 4. The locking devices 6 installed on a floor section 2 are identical to the locking devices 6 fitting out the floor sections 3; only their anchorage to the floor differs to the extent that the floor section 2 is not fitted with rails 4.

Figure 2:
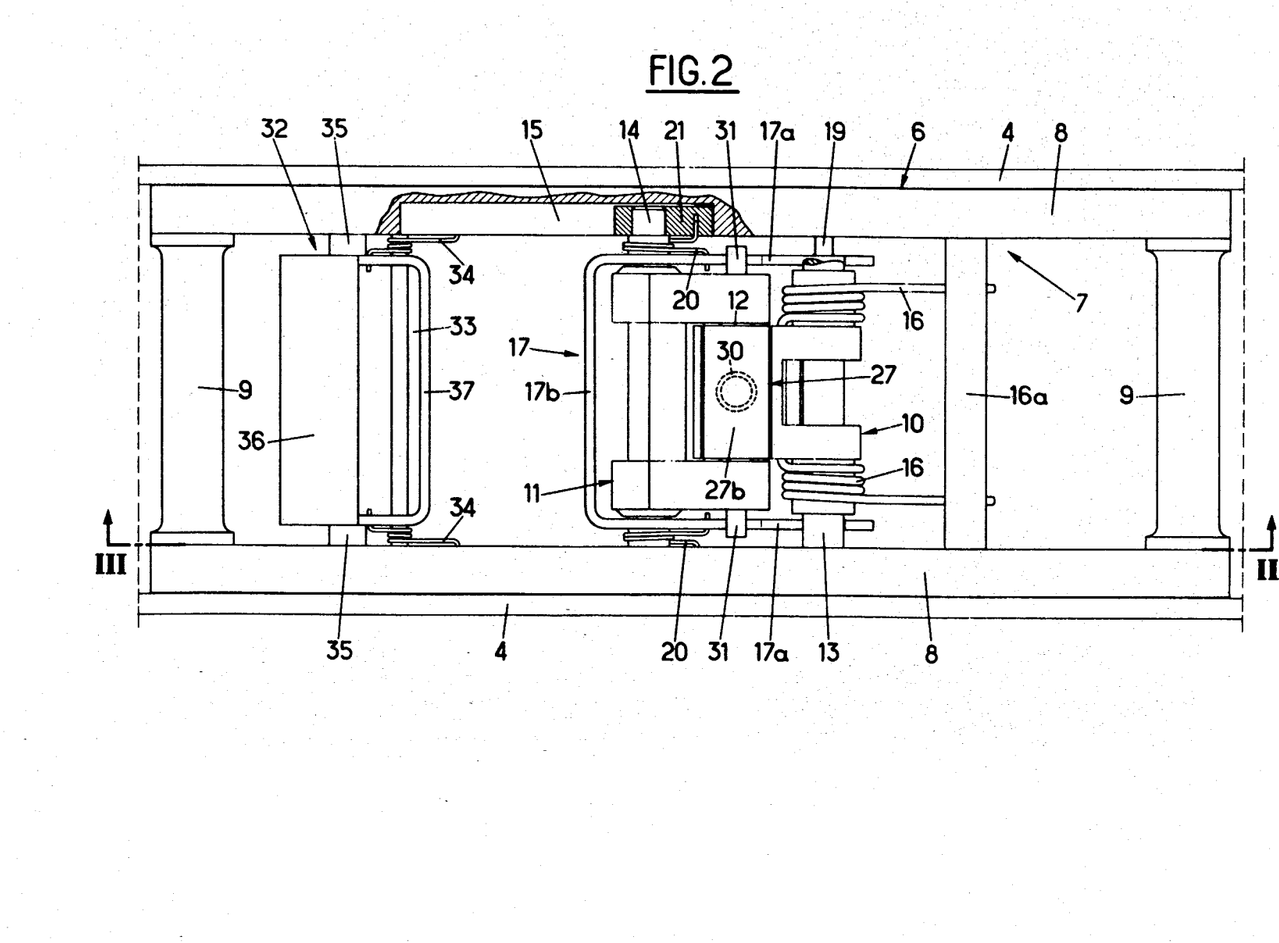
FIG. 2 is a plan view of a locking device conforming to the invention, in the cargo locking position.

With reference to FIG. 2, the locking device comprises a frame 7 consisting of two long members 8 connected together by two end cross members 9. Means not shown which do not come within this invention are provided on the frame 7 in order to fasten this latter into a U-shaped rail 4.

The locking device proper consists of two latches 10 and 11 hinged together at one of their ends by a transverse pin 12. Each latch 10, 11 has an overall longitudinal cross-sectional shape like a Z (zee), i.e. the two ends of each latch forming the two wings of the Z are bent in opposite directions with respect to the centre section forming the web of the Z. The two latches 10, 11 are connected together in a symmetrical position by the cross pin 12 in such a way that their bent ends connected together by the said pin 12 are turned towards each other and their other bent ends are away from each other (see FIG. 3).

The latch 11 has, at its end hinged on pin 12, the shape of a clevis which is entered by the corresponding end of latch 10.

The other end of latch 10 is hinged on a transverse pin 13 installed in a fixed position between the long members 8, whilst the other end of latch 11 is mounted on a transverse pin 14 the two ends of which are guided in translation in the internal longitudinal slideways 15 of the long members 8.

Figure 3:
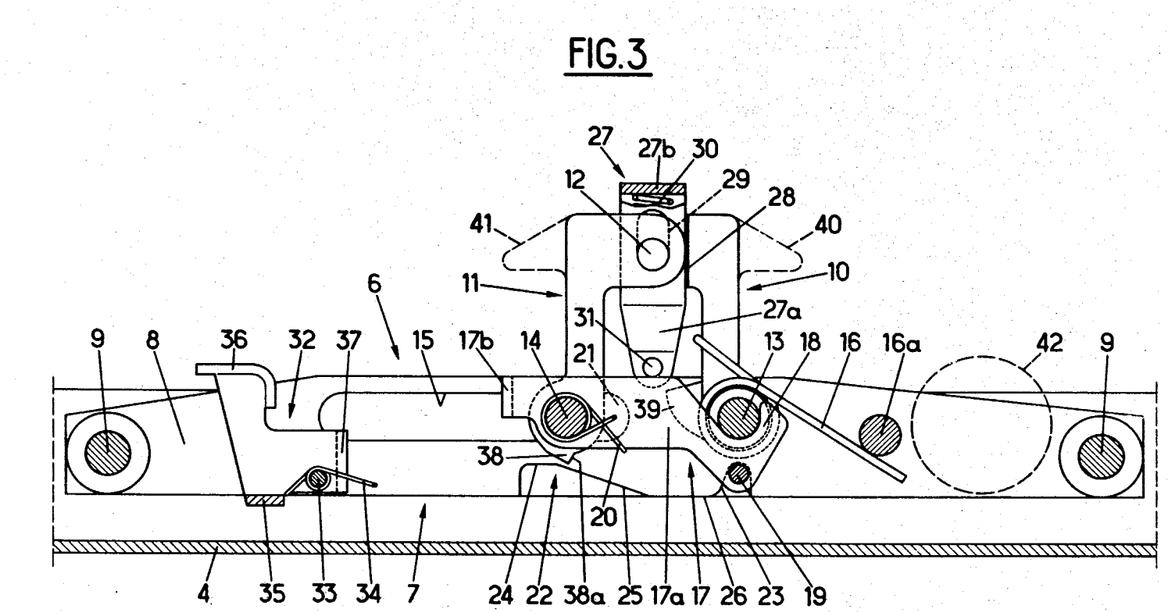
FIG. 3 is a sectional view along III—III of FIG. 2.

A spring 16 (first elastic means) bearing on latch 10 and on a fixed transverse bearing pin 16a constantly pushes latch 10 round the hinge pin 13 in a clockwise direction in FIG. 3.

A U-shaped blocking stirrup 17 is mounted to pivot by its two arms 17a, between the cross strap 17b and the free ends of the said arms 17a, on the hinge pin 14. The two arms 17a are shaped at their free ends facing the hinge pin 13 like hooks 18 opening upwards and each carrying below the said hooks a transverse guide pin 19 projecting outwards. The stirrup 17 is pushed round the pin 14 anticlockwise by a spring 20 (second elastic means) which bears against the arms 17a and each free end of which is engaged in a hole in a slide 21 which is installed to be movable longitudinally in the slideway 15 of each long member 8 (see FIG. 2). Each slide 21 also takes a free end of the hinge pin 14.

In accordance with FIG. 3 each long member also has a lower slideway 22 for one of the stirrup 17 guide pins 19. This slideway 22 comprises, at the end nearest the fixed hinge pin 13, a slot 23 opening downwards, with roughly vertical sides, located below the hinge pin 13 of latch 10 on the long members 8. At its other end furthest from the pin 13, each slideway 22 comprises a hollow 24 opening downwards which is connected by an inclined ramp 25, sloping down, and a horizontal cam surface 26 to the notch 23.

A transverse operating stirrup 27 is fitted to move longitudinally parallel to the plane of the cross strap of latch 10, i.e. vertically in the position in FIG. 3, on the end of latch 10 which is hinged by pin 12 on the other latch 11. The said end of latch 10 has on each side, for this purpose, a lateral guide groove 28 for one of the arms 27a of the stirrup 27 the cross strap of which 27b extends above the pin 12 of latches 10 and 11. Each arm 27a of the stirrup 27 has an oblong hole 29 in the long direction of the said arms, with the pin 12 of the latches 10 and 11 going through these holes 29. A compression spring 30 is inserted between the latch 10 and the cross strap 27b of the stirrup 27 to act on the latter to push its cross strap away from the latch 10 (upwards in FIG. 3).

Both of the arms 27a of stirrup 27 have, at their free end, an external cross pin 31. These pins 31 bear, in the position illustrated in FIG. 3, against the top edge of the arms 17a of stirrup 17, between the hinge pin 14 and the free hook-shaped ends 18 of the said arms 17a.

Near the end of the slideways 15 that is opposite the fixed hinge pin 13, a blocking lever 32 is fitted to pivot on a fixed transverse hinge pin 33 extending between the two long members 8. The blocking lever is pushed in a clockwise direction on FIG. 3 round pin 33 by a spring 34. A stop 35 provided on each side of the lever 32 to engage against the bottom face of the long member 8 limits the pivoting movement of the lever 32 acted on by the spring 34. A bearing surface 36 which can be reached from the top enables the lever 32 to be pivoted round pin 33 in an anticlockwise direction against the action of spring 34.

The lever 32 has, on the side facing the latches 10, 11, a cross piece 37 intended to engage with a cam 38 which is provided on latch 11 at the end at which latch 11 is hinged on pin 14 and which terminates with a setback 38a.

Figure 4:
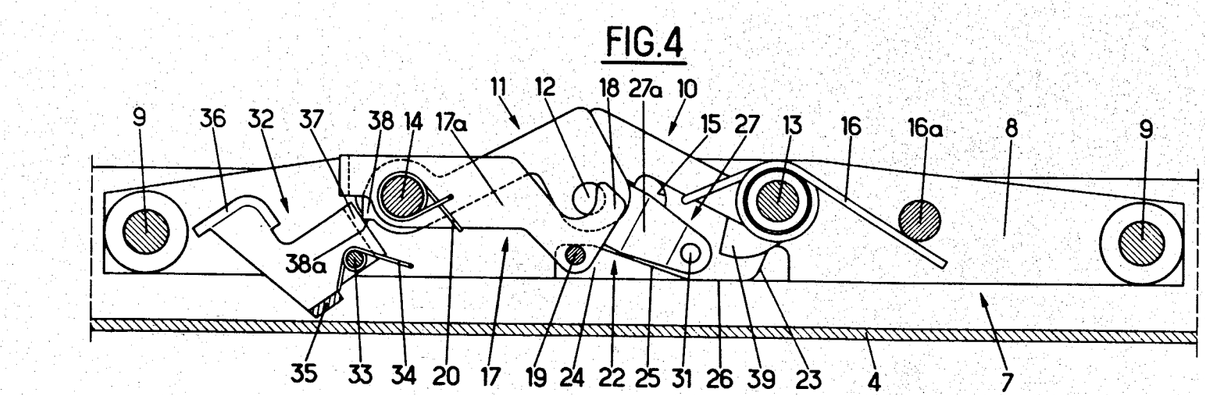
FIG. 4 is a corresponding sectional view of the locking device during the changeover of the latches from the locking position to the cargo unlocking position.
Figure 5:
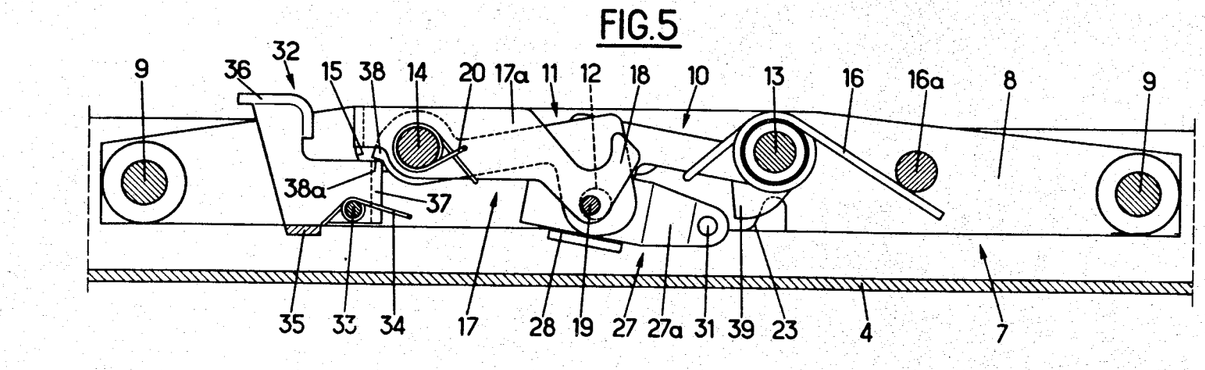
FIG. 5 is a corresponding sectional view of the locking device in the cargo unlocking position.

Referring to FIGS. 3, 4 and 5 we shall now describe hereafter the method of working of the locking device according to the invention.

In the cargo locking position illustrated by FIG. 3, the two latches 10 and 11 project up above the long members 8, their cross straps being roughly vertical. Latches 10 and 11 are blocked in this position by stirrup 17. Thus, the hooks 18 formed at the free ends of the arms 17a of the stirrup 17 are engaged, due to the action of the spring 20, from the bottom on the fixed hinge pin 13 of latch 10. At the same time the guide pins 19 provided at the free ends of the arms 17a of the stirrup 17 are engaged in the vertical slots 23 of the long members 8. Since the stirrup 17 is hinged on the movable pin 14 of latch 11, in this position it locks the two latches 10 and 11 relative to each other against any horizontal thrust exerted on latch 10 from the right in the drawing plane of FIG. 3. A horizontal thrust applied from the left on latch 11 does not result in release either owing to the fact that the slides 21 on which the hinge pin 14 of latch 11 is fitted are pressed against the right-hand end of the slideways 15 of the cross members 8.

In order to release the latches 10 and 11 from the cargo locking position in FIG. 1 and bring them to the cargo unlocking position, the foot is pressed down on the cross strap 27b of stirrup 27. Owing to the oblong holes 29 in its arms, with pin 12 going through them, the stirrup 27 slides downwards relative to latch 10 against the action of spring 30. The pins 31 provided on the free ends of the arms 27a of stirrup 27 then make stirrup 17 swing round the hinge pin 14 against the force of spring 20, in a clockwise direction in FIG. 3. The hooks 18 formed on the free ends of the arms 17a of the stirrup 17 thus disengage downwards from the fixed hinge pin 13 and, simultaneously, the guide pins 19 also provided on the free ends of the arms of stirrup 17 disengage downwards from the slots 23 in the long members 8.

As soon as the two latches 10, 11 are thus released, the top end of the oblong holes 29 of stirrup 27 bear against the pin 12 which therefore is subject to a downwards thrust. Since the pin and the two hinge pins 13 and 14 are located at the corners of a roughly isosceles triangle the vertex of which is formed by pin 12, the thrust applied downwards on pin 12 causes the two hinge pins 13 and 14 to move apart, i.e. pin 14 to move left in FIG. 3, since pin 13 is fixed. The slides 21 on which hinge pin 14 is fitted therefore slide left in the slideways 15 of the long members 8, whilst the pins 19 of stirrup 17 mounted on hinge pin 14 travel over the cams 26 and the ramps 25 as far as the hollows 24 in the slideways 22. During this leftwards movement by hinge pin 14, the two latches 10 and 11 swivel in opposite directions round the hinge pins 13 and 14, with their common pivot pin 12 moving down.

Shortly before the pivot pin 12 reaches the horizontal plane defined by hinge pins 13 and 14, which corresponds to the position of maximum spacing between the two hinge pins 13 and 14, the cam 38 formed on the end of latch 11 which hinges on pin 14 comes into contact with the cross member 37 of the lever 32 and swings this anticlockwise in FIG. 4 round pin 33, against the action of the spring 34. The pivot pin 12 then drops below the horizontal plane defined by hinge pins 13 and 14 so that pin 14 again approaches pin 13, with the cam 38 continuing to rotate round pin 14 until the lever 32 is released when the latches 10 and 11 are completely retracted below the top edge of the long members 8. Being acted on by its spring 34, the lever 32 pivots in a clockwise direction and the top edge of its cross member 37 hooks under the shoulder 38a of the cam 38, thus blocking the latches 10 and 11 in the cargo unlocking position (FIG. 5).

Throughout the pivoting movement of latches 10 and 11 from the position in FIG. 3 to the position in FIG. 5, the spring 16 has been wound up.

In order to bring the locking device from the cargo unlocking position according to FIG. 5 to the cargo locking position according to FIG. 3, foot pressure is applied downwards on the operating surface 36 of the lever 32. The lever 32 thus pivots anticlockwise against the action of its spring 32, until the top edge of the cross member 37 disengages from the shoulder or setback 38a of the the cam 38 on latch 11 thus releasing the latches 10 and 11. The wound up spring 16 then makes the latch 10 rotate clockwise round pin 13. This pulls the pivot pin 12 up so that latch 11, connected to latch 10 by the said pivot 12, rotates in an anticlockwise direction round its hinge pin 14 which, at the same time, moves to the right in the slideways 15. The pin 14 therefore approaches pin 13 whilst the pivot pin 12 and the ends of the two latches 10 and 11 hinging on each other by means of the said pivot pin 12 move upwards.

Stirrup 17 hinged on pin 14 moves right jointly with pin 14. Consequently the two guide pins 19 provided on the free ends of the arms 17a of stirrup 17 which is pushed anticlockwise round pin 14 by the spring 20, move from the hollow 24 onto the ramp 25 and onto the cam 26. The stirrup 17 thus swings clockwise round pin 14 so that the hooks 18 formed on the free ends of the arms 17a of stirrup 17 move down to pass under pin 13. The guide pins 19 then leave the cam 26 and engage in the notches 23 so that the stirrup 17 can swing anticlockwise round pin 14, under the action of its spring 20, and so that the hooks 18 engage upwards from the bottom onto hinge pin 13, so the stirrup 17 again blocks the two hinge pins 13 and 14 locking them in their relative positions, and thus blocking the latches 10 and 11 in the cargo locking positions according to FIG. 3.

In the locking device according to the invention, the latches 10 and 11 are therefore changed from the cargo unlocking position in which they are blocked by the lever 32, to the cargo locking position in which they are blocked or locked by the stirrup 17 automatically by the action of the spring 16 after release by foot pressure applied on lever 32. The changeover of the latches 10 and 11 from the cargo locking position to the cargo unlocking position involves foot pressure on stirrup 27 to firstly release the latches 10 and 11 and subsequently to retract latches 10 and 11 below the upper edge of the long members 8, with the spring 16 being simultaneously wound back. In order to reduce the force needed for this purpose it is advantageous to design the spring 16 in such a manner that it is almost slack in the cargo locking position. If, for example, owing to fouling tending to hold back the movement of latches 10 and 11 from the cargo unlocking position to the cargo locking position under the action of spring 16, the residual force in the latter were not sufficient to bring the two hinge pins 13 and 14 close enough for them to jointly blocked by stirrup 17, the locking device could nevertheless be blocked in the cargo locking position, without manual intervention on the locking device, by the horizontal thrust exerted on latch 11 (from left to right in FIG. 3) by the container (or the pallet) when this container is pushed to the position in which it must be locked. Thus, this horizontal thrust on the latch 11 would move the hinge pin 14 to the right as far as the right-hand ends of the slideways 15, to engage the hooks 18 and the guide pins 19 under the action of spring 20, onto hinge pin 13 and in the notches 23, thus ensuring the latches 10 and 11 are locked in the cargo locking position.

It can be seen in FIGS. 3, 4 and 5 that a cam 39 is formed on latch 10, at the end of latch 10 hinging on hinge pin 13. The purpose of this cam 39 is to actuate a limit switch signalling that the locking device is actually locked and blocked in the cargo locking position.

The embodiment described above and shown in the attached drawings has only been given as an illustration and is not restrictive; many modifications and variants can be made to it within the framework of this invention. Thus, in a manner known per se, the two latches 10 and 11 can be each fitted with holding-down wings 40, 41 shown by a broken line in FIG. 3, so that the locking devices not only block the containers or pallets horizontally but also vertically. In this case the two latches 10 and 11 must, in the cargo unlocking position, be retracted deeper into the frame 7 so that the said wings 40 and 41 also come to lie below the upper edge of the long members 8. All that is needed to do this is to shift the cam 38 angularly anticlockwise relative to the position shown so that, in combination with the lever 32, it blocks the latches 10 and 11 in a position in which the pivot pin 12 lies in a lower position than in FIG. 5.

In addition, in order to improve the running of the containers or pallets on the rows of rollers at the locations of the locking devices which take up the place of one or more rollers, it would be possible to install a roller 42 directly on the locking device, as indicated by the broken line in FIG. 3. It should, however, be noted that, owing to the short length of the locking device overall, it is not generally indispensable to provide such a roller 42 on the locking device frame.

In the described embodiment, the locking device frame is fastened in channel rails which are recessed into the floor 3 of the cargo compartment and are fitted with handling rollers. This fastening is carried out by means not shown, for example two pins installed to slide in each cross member of the locking device frame, at the two ends of this cross member, and pushed outwards by an intermediate compression spring in such a manner as to be able to enter holes made in the rail flanges. However, the locking devices may, within the framework of the invention, be fixed differently, in particular in a known manner by sets of fingers with enlarged heads and clamping plungers engaging with rails with sockets provided in the floor.

Since, for example, the pallets used for air freight are available in two standard sizes (88 and 96 inches), it may be advantageous, in order to deal with these two types of pallet on one floor, to install twin locking devices on the floor, i.e. locking devices containing, on one single longer frame, at least two locking systems spaced so that either of the locking systems may be used depending on whether it is necessary to secure a pallet of one type or the other.

Finally, it should be pointed out that the locking device in accordance with the invention is applicable not only to aircraft but also, for example, to road or rail transport vehicles.

I claim:

1. A locking device for securing cargo in a vehicle, comprising:
    a frame (7) comprising two first members (8) joined together by two second cross members (9) and capable of being fixed to the floor of the vehicle space intended to accommodate the cargo;
    a first latch (10) and a second latch (11) hinged together at one of their ends by a common transverse pivot pin (12), said first latch (10) having at its non-hinged end a transverse hinge pin (13) mounted in a fixed position between said first members (8), and said second latch (11) having at its non-hinged end a transverse hinge pin (14) guided in translation in longitudinal slideways (15) in said first members (8);
    means for changing said first and second latches (10, 11) from a cargo unlocking position, in which said latches are retracted down into said frame and said transverse hinge pins (13, 14) are separated to a cargo locking position, in which said first and second latches (10, 11) project above said frame (7) and said transverse hinge pins (13, 14) are brought near to each other;
    spring means for drawing said first and second latches (10, 11) from the cargo unlocking position to the cargo locking position; and
    first blocking means for blocking said first and second latches (10, 11) in the cargo unlocking position and second blocking means for blocking said first and second latches (10, 11) in the cargo locking position, respectively.

2. The locking device as claimed in claim 1, wherein said second blocking means is mounted on said first and second latches (10, 11) in such a way that, in the cargo locking position, the operating surface of said second blocking means is placed above said common transverse pivot pin (12) of said first and second latches (10, 11).

3. The locking device according to claim 2, wherein said second blocking means comprises:
    a second elastic means comprising a spring (20);
    a blocking stirrup (17) having a cross strap (17b) and two arms (17a) coextensive with and extending perpendicularly from each end of said cross strap (17b), said arms (17a) of said blocking stirrup (17) terminating in free ends (18) opposite said cross strap (17b), said free ends (18) of said arms (17a) of said blocking stirrup (17) being hook-shaped and opening upwards, said arms (17a) of said blocking stirrup (17) being parallel to each other and being perpendicular to said transverse hinge pins (13, 14) of said first and second latches (10, 11);
    said blocking stirrup (17) being fitted between said cross strap (17b) and said hook-shaped free ends (18) of said arms (17a) of said blocking stirrup (17), so as to pivot on said transverse hinge pin (14) of said second latch (11), so that said hook-shaped free ends (18) of said arms (17a) of said blocking stirrup (17) are facing said transverse hinge pin (13) of said first latch (10) and are pushed upwards around said transverse hinge pin (14) of said second latch (11) by said spring (20).

4. The locking device according to claim 3, wherein said hook-shaped free ends (18) of said arms (17a) of said blocking stirrup (17) comprise external guide pins (19), said guide pins (19) work under the action of said spring (20) and with a lower slideway (22) comprising a ramp (25), to make said hook-shaped free ends (18) of said arms (17a) swing downward and under said transverse hinge pin (13) of said first latch (10) when said first latch (10) is changed over from the cargo unlocking position to the cargo locking position, said locking device further comprising a notch (23) with substantially vertical sides which enables said hook-shaped free ends (18) of said arms (17a) to swing upward and engage on said transverse hinge pin (13) of said first latch (10) in the cargo locking position.

5. The locking device as claimed in claims 3 or 4, further comprising:
    means for operating said blocking stirrup (17) comprising an operating stirrup (27);
    said operating stirrup (27) comprising two arms (27a) perpendicular to said transverse hinge pins (13, 14) of said first and second latches (10, 11) and a cross strap (27b) joining the upper ends of said arms (27a) of said operating stirrup (27), said arms (27a) of said operating stirrup (27) being movable in a longitudinal direction on said first latch (10), said arms (27a) of said operating stirrup (27) terminating in free bottom ends opposite said cross strap (27b) of said operating stirrup (27);
    said operating stirrup (27) being arranged so that said cross strap (27b) lies above said first and second latches (10, 11) when said first and second latches (10, 11) assume the cargo locking position;
    said free bottom ends of said arms (27a) of said operating stirrup (27) having a transverse pin (31) bearing in the cargo locking position against the top edge of said arms (17a) of said blocking stirrup (17) between said transverse hinge pin (14) of said second latch (11) and said hook-shaped free ends (18) of said blocking stirrup arms (17a).

6. The locking device as claimed in claim 5, wherein said operating stirrup (27) has in each of its said arms (27a) an oblong hole (29) extending in the longitudinal direction of said arms (27a), each said oblong hole (29) having said common transverse pivot pin (12) passing through it.

7. The locking device as claimed in claim 6, wherein said first blocking means comprises a lever (32) for pivoting on said frame (7) through a transverse pin (33) and biased in one direction by a return spring (34), a cam (38) on said second latch (11) around said transverse hinge pin (14) of said second latch (11), with said cam (38) terminating in a setback (38a) and engaging with said lever (32) of said first blocking means to block said second latch (11) in the cargo unlocking position.

8. A locking device for securing cargo in a vehicle, comprising:
- a frame (7) comprising two bars (8) connected together by two terminal cross members (9), said frame (7) capable of being fixed to the floor of the vehicle which receives the cargo;
- a first latch (10) and a second latch (11) hinged together at one of their ends by a common transverse pivot pin (12), said first latch (10) having at its non-hinged end a transverse hinge pin (13) mounted in a fixed position between said bars (8) and said second latch (11) having at its non-hinged end a transverse hinge pin (14) guided in translation in longitudinal slideways (15) in said bars (8), whereby said common transverse pivot pin (12) of said first and second latches (10, 11) is at the apex of an essentially isosceles triangle, the two other angles of which are defined by said transverse hinge pin (13) of said first latch (10) and by said transverse hinge pin (14) of said second latch (11), whereby said first and second latches (10, 11) can be brought from a cargo unlocking position in which they are retracted downward into said frame (7) and in which said transverse hinge pins (13, 14) are separated, into a cargo locking position in which said first and second latches (10, 11) project upward on said frame (7) and in which said transverse hinge pins (13, 14) are close to one another;
- a first elastic means for drawing said first and second latches (10, 11) from the cargo unlocking position to the cargo locking position, and a second elastic means;
- a first blocking means for blocking said first and second latches (10, 11) in cargo unlocking position against the drawing force of said first elastic means;
- a second blocking means for blocking said first and second latches (10, 11) in a cargo locking position, whereby said second blocking means is pivotably mounted on said transverse hinge pin (14) of said second latch (11) and is adapted so that, under the action of said second elastic means, said second blocking means cooperates in a hook-like manner with said transverse hinge pin of said first latch (10) in order to prevent said first and second hinge pins (13, 14) of said first and second latches (10, 11) from separating from one another; and
- a blocking releasing means for releasing the effect of said first and second latches (10, 11) in the cargo locking position, whereby said blocking releasing means is mounted on said first and second latches (10, 11) in such a way that in the cargo locking position an operating surface of said blocking releasing means is located above said common transverse pivot pin (12) of said first and second latches (10, 11) whereby said blocking releasing means is constructed in such a way that when foot pressure is applied to said operating surface of said blocking releasing means it causes said second blocking means to pivot against the action of said second elastic means in order to release said second blocking means from said transverse hinge pin (13) of said first latch (10) in such a fashion that under the action of the foot pressure applied, said first and second latches (10, 11) can be brought into unlocking position and can be blocked in this position by said first blocking means against the action of said first elastic means.

9. The locking device as claimed in claim 8, wherein said second blocking means is mounted on said first and second latches (10, 11) in such a way that, in the cargo locking position, the operating surface of said second blocking means is placed above said common transverse pivot pin (12) of said first and second latches (10, 11).

10. The locking device according to claim 9, wherein said second blocking means comprises:
- a second elastic means comprising a spring (20);
- a blocking stirrup (17) having a cross strap (17b) and two arms (17a) coextensive with and extending perpendicularly from each end of said cross strap (17b), said arms (17a) of said blocking stirrup (17) terminating in free ends (18) opposite said cross strap (17b), said free ends (18) of said arms (17a) of said blocking stirrup (17) being hook-shaped and opening upwards, said arms (17a) of said blocking stirrup (17) being parallel to each other and being perpendicular to said transverse hinge pins (13, 14) of said first and second latches (10, 11);
- said blocking stirrup (17) being fitted between said cross strap (17b) and said hook-shaped free ends (18) of said arms (17a) of said blocking stirrup (17), so as to pivot on said transverse hinge pin (14) of said second latch (11), so that said hook-shaped free ends (18) of said arms (17a) of said blocking stirrup (17) are facing said transverse hinge pin (13) of said first latch (10) and are pushed upwards around said transverse hinge pin (14) of said second latch (11) by said spring (20).

11. The locking device according to claim 10, wherein said hook-shaped free ends (18) of said arms (17a) of said blocking stirrup (17) comprise external guide pins (19), said guide pins (19) work under the action of said spring (20) and with a lower slideway (22) comprising a ramp (25), to make said hook-shaped free ends (18) of said arms (17a) swing downward and under said transverse hinge pin (13) of said first latch (10) when said first latch (10) is changed over from the cargo unlocking position to the cargo locking position, said locking device further comprising a notch (23) with substantially vertical sides which enables said hook-shaped free ends (18) of said arms (17a) to swing upward and engage on said transverse hinge pin (13) of said first latch (10) in the cargo locking position.

12. The locking device as claimed in claims 10 or 11, further comprising:
- means for operating said blocking stirrup (17) comprising an operating stirrup (27);
- said operating stirrup (27) comprising two arms (27a) perpendicular to said transverse hinge pins (13, 14) of said first and second latches (10, 11) and a cross strap (27b) joining the upper ends of said arms (27a) of said operating stirrup (27), said arms (27a) of said operating stirrup (27) being movable in a longitudinal direction on said first latch (10), said arms (27a) of said operating stirrup (27) terminating in free bottom ends opposite said cross strap (27b) of said operating stirrup (27);
- said operating stirrup (27) being arranged so that said cross strap (27b) lies above said first and second latches (10, 11) when said first and second latches (10, 11) assume the cargo locking position;
- said free bottom ends of said arms (27a) of said operating stirrup (27) having a transverse pin (31) bearing in the cargo locking position against the top edge of said arms (17a) of said blocking stirrup (17) between said transverse hinge pin (14) of said second latch (11) and said hook-shaped free ends (18) of said blocking stirrup arms (17a).

13. The locking device as claimed in claim 12, wherein said operating stirrup (27) has in each of its said arms (27a) an oblong hole (29) extending in the longitudinal direction of said arms (27a), each said oblong hole (29) having said common transverse pivot pin (12) passing through it.

14. The locking device as claimed in claim 13, wherein said first blocking means comprises a lever (32) for pivoting on said frame (7) through a transverse pin (33) and biased in one direction by a return spring (34), a cam (38) on said second latch (11) around said transverse hinge pin (14) of said second latch (11), with said cam (38) terminating in a setback (38a) and engaging with said lever (32) of said first blocking means to block said second latch (11) in the cargo unlocking position.

* * * * *